B. F. WALTERS.

PEA NUT AND COFFEE POLISHER.

No. 9,943. Reissued Nov. 22, 1881.

Witnesses:
H. S. Low
J. S. Barker

Inventor:
Benjamin F. Walters
by Doubleday and Bliss
Attys

N. PETERS, Photo-Lithographer, Washington, D. C.

UNITED STATES PATENT OFFICE.

BENJAMIN F. WALTERS, OF NORFOLK, VIRGINIA.

PEANUT AND COFFEE POLISHER.

SPECIFICATION forming part of Reissued Letters Patent No. 9,943, dated November 22, 1881.

Original No. 128,515, dated July 2, 1872. Application for reissue filed May 11, 1881.

*To all whom it may concern:*

Be it known that I, BENJAMIN F. WALTERS, a citizen of the United States, of Norfolk, in the county of Norfolk and State of Virginia, have invented certain new and useful Improvements in Peanut and Coffee Polishers; and I do hereby declare that the following is a full, clear, and exact description of the invention, that will enable others skilled in the art to which it appertains to make and use the same, reference being had to the accompanying drawings, and to letters of reference marked thereon, which form a part of this specification.

Figure 1:
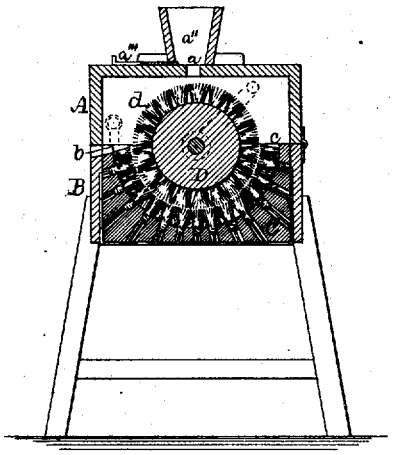
Figure 2:
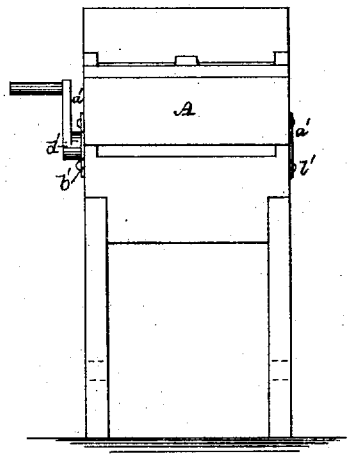

Figure 1 is a section across the cylinders, and Fig. 2 is a front elevation.

The casing is formed of two parts, A B. The top part, A, is slotted at *a* and provided with hooks *a′ a′* and hopper $a^2$, which has a sliding bottom, $a^3$. The bottom B is recessed at *b*, has concave C, covered with brush *c*, and is also provided with studs *b′ b′* for the hooks. D is a cylinder or roll, provided with an annular brush, *d*, and a crank-shaft, *d′*.

The mode of operation is as follows: The cylinder is rotated to the right and the peanuts and coffee-berries poured into the hopper $a^2$, from whence they descend upon the annular and rotating brush. They are then carried to the right side of the box to one end of the concave, from thence around and between the brushes to the top of said concave, and are then thrown upon the inclined bottom of slot *b*, which conducts them to the outside.

I am aware that convex and concave cylinders provided with polishing brushes which interlap each other have been employed for analogous uses; but I believe that none have been ever used by the public wherein stiff brushes are employed on the opposite convex and concave cylinders, or parts of cylinders, which do not interlap, but have their ends brought only into sufficient proximity to allow the nut or coffee-bean to pass between them.

What I claim is—

1. The polishing machine herein described and shown, consisting of the lower casing, B, provided with the exit *b*, the upper casing, A, hinged to the lower part and provided with the aperture *a*, the cylinder D, and the concave C, provided with the bristle-brushes *c d*, constructed and arranged to operate in the manner and for the purpose set forth.

2. In a brushing and polishing machine, a rotating brush having non-metallic bristle-filaments whose outer ends form a continuous surface, in combination with an opposing brush whose outer ends are also arranged to form a continuous surface, said brushes being arranged with their surfaces substantially parallel, and in connection with an exit for continuously discharging the material, and an inlet for continuously supplying the same, substantially as set forth.

3. The combination of a rotatory brush mounted on a horizontal axis, and armed with bristles having their outer ends arranged to form a substantially continuous brushing-surface, and an opposing brush composed of bristles whose outer ends form a yielding but substantially continuous brushing surface, as set forth.

4. The combination of a rotatory brush mounted on a horizontal axis, and having its brush-filaments arranged to form a substantially continuous surface, and an opposing brush having yielding filaments, arranged to provide a passage between the ends of the opposing filaments, wherein the material is carried vertically by the brushes, substantially as set forth.

5. The combination, with the supporting-casing provided with openings for supply and discharge, of a rotating brush on a horizontal axis, and having a continuous surface, and an opposing brush having a continuous surface, arranged, substantially as described, to have said brushes lift the material upward between the opposing brush-surfaces before it escapes from the casing, substantially as set forth.

6. In a brushing and polishing machine, the combination of a rotating brush on a horizontal axis, and having a continuous brush-surface, and a stationary brushing-surface extending continuously around the bottom of the rotating brush, and arranged, substantially as described, to be adapted to discharge the material from between the brush-surfaces, above the bottom thereof, substantially as set forth.

In testimony whereof I affix my signature in presence of two witnesses.

BENJAMIN F. WALTERS.

Witnesses:
J. S. BARKER,
H. H. BLISS.